US006964826B2

(12) United States Patent
Ovshinsky et al.

(10) Patent No.: US 6,964,826 B2
(45) Date of Patent: Nov. 15, 2005

(54) COATED CATALYTIC MATERIAL WITH A METAL PHASE IN CONTACT WITH A GRAIN BOUNDARY OXIDE

(75) Inventors: Stanford R. Ovshinsky, Bloomfield Hills, MI (US); Benjamin Reichman, West Bloomfield, MI (US); Michael A. Fetcenko, Rochester, MI (US); Kwo Young, Troy, MI (US); William Mays, Livonia, MI (US); James Strebe, Clawson, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 41 days.

(21) Appl. No.: 10/200,612

(22) Filed: Jul. 22, 2002

(65) Prior Publication Data

US 2003/0050188 A1 Mar. 13, 2003

Related U.S. Application Data

(63) Continuation of application No. 09/859,164, filed on May 16, 2001, now Pat. No. 6,740,448, which is a division of application No. 09/575,313, filed on May 19, 2000, now Pat. No. 6,461,766, and a division of application No. 09/290,633, filed on Apr. 12, 1999, now Pat. No. 6,270,719, and a continuation-in-part of application No. 09/523,820, filed on Mar. 13, 2000, now Pat. No. 6,841,512.

(51) Int. Cl.$^7$ .......................... H01M 4/38; H01M 4/52; B01J 23/00
(52) U.S. Cl. ............................ 429/44; 429/40; 429/223; 502/335; 502/338; 420/451; 420/452
(58) Field of Search .......................... 429/40, 44, 223, 429/218.2, 45; 420/451–52; 502/335–338, 159–60, 326–28

(56) References Cited

U.S. PATENT DOCUMENTS 6,379,833 B1 * 4/2002 Hill et al. .................... 429/34

FOREIGN PATENT DOCUMENTS

JP          59104442       *  6/1984  ............. C22C/1/08

* cited by examiner

Primary Examiner—Mark Ruthkosky
(74) Attorney, Agent, or Firm—Frederick W. Man, II; Marvin S. Siskind

(57) ABSTRACT

An industrial catalyst having: a support; a plurality of metallic particulates distributed throughout the support; and a metal at least partially covering the surface of the support.

A method for making a catalyst including the steps of: forming a support with non-noble metal particulates distributed throughout the support; and at least partially covering the surface of the support with a metal.

14 Claims, 4 Drawing Sheets

Etching Time : 2 hours

Etching Time : 10 hours

Etching Time : 2 hours — Etching Time : 10 hours

COATED CATALYTIC MATERIAL WITH A METAL PHASE IN CONTACT WITH A GRAIN BOUNDARY OXIDE

REFERENCE TO RELATED APPLICATIONS

The present invention is a continuation in part of U.S. patent application Ser. No. 09/859,164, now U.S. Pat. No. 6,740,448, entitled "Modified Electrochemical Hydrogen Storage Alloy Having Increased Capacity, Rate Capability and Catalytic Activity", filed May 16, 2001 which is a divisional application from U.S. patent application Ser. No. 09/575,313, now U.S. Pat. No. 6,461,766, filed May 19, 2000 and U.S. patent application Ser. No. 09/290,633, now U.S. Pat. No. 6,270,719, filed Apr. 12, 1999; and is a continuation in part of U.S. patent application Ser. No. 09/523,820, now U.S. Pat. No. 6,841,512, entitled "Finely Divided Metal Catalyst And Method For Making The Same", filed Mar. 13, 2000, the disclosures of which are herein incorporated by reference.

BACKGROUND OF THE INVENTION

I. Field of the Invention

The present invention pertains generally to catalysts and more specifically to electrocatalysts, hydrogenation catalysts, hydrocracking catalysts and hydrogen oxidation catalysts.

II. Description of the Background

A fuel cell is an electrochemical device in which chemical energy of a reaction is converted into low voltage electrical energy. Fuel cells have many potential applications, such as supplying power for vehicles, replacing steam turbines and remote power supply applications.

The major components of a fuel cell include an anode for hydrogen oxidation and a cathode for oxygen reduction. The anode and cathode are typically positioned in a cell with an electrolyte. In an alkaline fuel cell, the anode is for hydrogen oxidation and a the cathode for oxygen reduction. Reactants are usually fed through a porous anode and cathode and brought into surface contact with the electrolytic solution. To speed up reactions at the surface, the electrodes are each supplied with catalysts.

Fuel cells are typically supplied with a continuous flow of reactants from outside the cell. In an alkaline fuel cell the reactants include hydrogen and oxygen. The reaction at the anode is between hydrogen and hydroxyl ions (OH⁻) present in the electrolyte, which react to form water and release electrons:

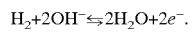

$H_2 + 2OH^- \leftrightarrows 2H_2O + 2e^-$.

At the cathode, oxygen, water, and electrons react in the presence of the cathode catalyst to reduce oxygen and form hydroxyl ions (OH⁻):

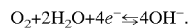

$O_2 + 2H_2O + 4e^- \leftrightarrows 4OH^-$.

The flow of electrons is used to provide electrical energy for a load externally connected between the anode and cathode.

Stanford Ovshinsky and colleges have made numerous discoveries in the field of material science and more particularly in the filed of disordered and amorphous materials, some of which are described in U.S. Pat. No. 4,430,391 entitled "Fuel Cell Cathode" issued Feb. 7, 1984; U.S. Pat. No. 4,537,674 entitled "Electrolytic Cell Anode" which issued Aug. 27, 1985; and U.S. Pat. No. 5,840,440 entitled "Hydrogen Storage Materials Having A High Density of Non-Conventional Useable Hydrogen Storing Sites" issued Nov. 24, 1998.

As taught by Ovshinsky, disorder in a modified material can be of an atomic nature in the form of compositional or configurational disorder provided throughout the bulk of the material, in various regions or phases of the material, or in the surface of the material. Disorder can also be introduced into the host matrix by creating phases of intermediate order within the material which mimic the compositional or configurational disorder at the atomic level by virtue of the relationship of one phase to another.

Disorder can be tailored by introducing microscopic regions or phases of different kinds, such as crystalline phases, or by introducing regions of amorphous material, or by introducing regions of amorphous material in addition to crystalline regions. Disorder can provide local structural chemical environments with improved characteristics by selecting elements which by their orbital interaction can create new and improved local environments. These specialized local environments may be provided by amorphous materials, microcrystalline materials, multi-component, multiphase, polycrystalline materials, multi-component, multiphase, polycrystalline materials lacking long range composition order, materials of intermediated order, microcrystalline phases, nanocrystalline phases, and/or multiphase materials containing both amorphous and crystalline phases.

Short-range, or local order has been elaborated by Ovshinsky in U.S. Pat. No. 4,520,039, entitled *Compositionally Varied Materials and Method for Synthesizing the Materials*, the contents of which are incorporated by reference. This patent teaches that disordered materials do not require periodic local order and that spatial and orientational placement of similar or dissimilar atoms or groups of atoms is possible with such increased precision and control that the local configurations can be engineered to produce qualitatively new phenomena. The elements of these materials offer a variety of bonding possibilities due to the multidirectionality of f-orbitals, d-orbitals or lone pair electrons. The multidirectionality ("porcupine effect") of d-orbitals provides for a tremendous increase in the spectrum and the density of chemically active sites. However, the types of atoms need not be restricted to "d band" or "f band" atoms, but can be any configuration in which the controlled aspects of the interaction with the local environment and/or orbital overlap plays a significant role physically, electronically, or chemically so as to affect physical properties, and hence the functionality of the materials. Following these teachings, one can synthesizing new materials which may even have the same chemical composition, but in fact provide substantially different physical properties.

Despite the above advances provided in the past, alkaline fuel cells have not found wide commercial acceptance due to the competing use of fossil fuels and the internal combustion engine. Therefore, to bring fuel cells to the forefront of wide scale commercial practicality, what is needed is an improved, high efficiency catalytic material useful in fuel cells that can be mass produced at a relatively low cost.

SUMMARY OF THE INVENTION

The present invention addresses one or more of the above-mentioned deficiencies and others by providing an industrial catalyst having a support with metal particulates distributed throughout the support and an enriched, catalytic metal surface.

In one embodiment of the invention, the metal particulates include at least one non-noble metal.

In another embodiment, the enriched metal surface includes at least one non-noble metal.

In a preferred embodiment of the present invention, the support is a metal oxide and the metal particulates are provided from metal atoms native to the oxide support, while the enriched catalytic metal surface is provided with metal atoms that are not non-native to the metal oxide.

In the present invention, there is provided a method for making a catalyst, which includes forming a support with catalytic metal particulates; and enriching the surface of the support with catalytic metal.

For a more complete understanding of the present invention, reference is now made to the following detailed description and accompanying drawings.

DETAILED DESCRIPTION OF THE PREFERRED EMBODIMENTS

Figure 1A:
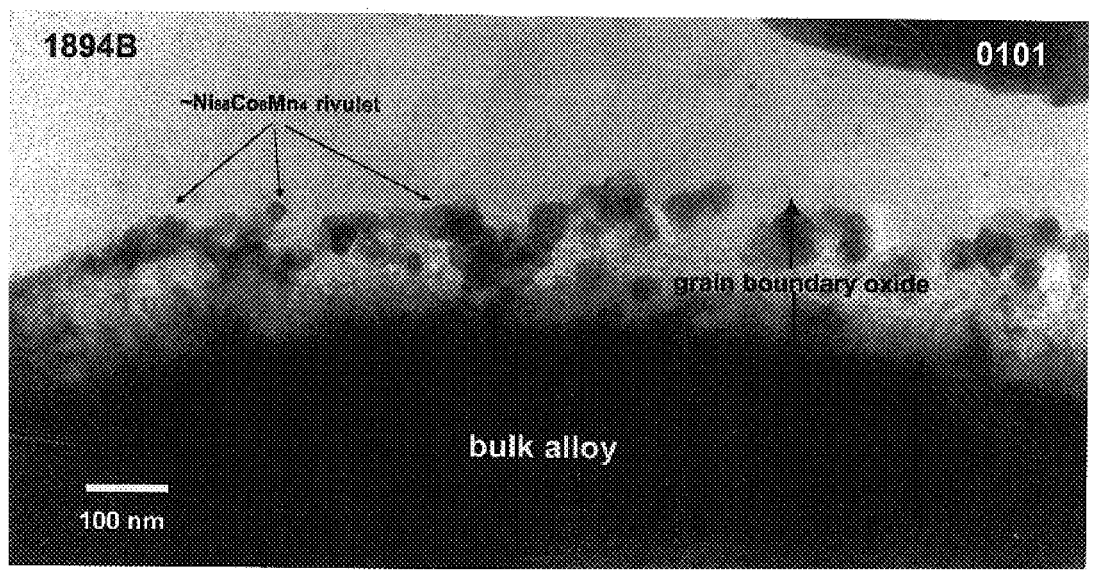
FIG. 1a is a dark-field view of a catalyst in accordance with the present invention.

In accordance with the present invention there is provided a catalyst which comprises a support having a plurality of metal particulates. The metal particulates may be affixed to the support in any reasonable manner, such as affixed to the surface of the support or alternately, at least partially embedded within the support or both. Preferably, the particles are embedded within the support, and more preferably below the surface.

The metal particulates preferably include a plurality of metal atoms and/or crystallites. The particulates may be substantially pure material, an alloy of two or more elemental metals, or a compound. In a preferred embodiment, at least some of the particles are provided as a composite or mixture, such as having two or more elemental metals, two or more alloys, or elemental metal and an alloy. All of the particles may have the same composition or they may be a mixture of particles with different compositions. In addition, some of the particles may be substantially pure elemental metals while others may be alloys of two or more elemental metals.

In a preferred embodiment of the present invention, the metal particles are non-noble metal. Alternatively, noble metals may be provided in the support, but separate from the particles. In another alternative embodiment, non-noble metals may be combined in the particles with noble metals, preferably as an alloy, composite, or solid solution.

In a more preferred embodiment of the present invention, the metal particulates include metallic nickel and/or nickel alloy. If the metal particles include nickel alloy, the nickel alloy preferably includes nickel and at least one additional transition metal. Preferred transitional elements include Co and Mn.

The catalytic metal particles of the present invention are not limited to any particular shape and as such may be regularly shaped, irregularly shaped or both. Examples of preferred particle shapes include dendrites, spherical, elongated, thread-like, tentacle, etc.

It is noted that the catalytic activity of a material may be determined by measuring the material's exchange current Io (measured in mA/g). The exchange current Io is a function of both the material's exchange current density io (measured in mA/m2) as well as the material's surface area A (m2/g). Specifically, the exchange current, the exchange current density and the surface area are all related as follows:

$$Io = io \times A. \tag{1}$$

Equation (1) shows that the total catalytic activity of a material (as measured by the total exchange current Io) is a function of both the catalytic activity of the material composition (as measured by the exchange current density io) as well as the surface area of the material A. Hence, the total catalytic activity of a material may be increased by either appropriately changing its composition to one which is more catalytic or by increasing its effective surface area.

Preferably, the catalytic metal particles of the present invention have a very small particle size. Specifically, the particles have an average particle size which is preferably 150 Angstroms or less, 100 Angstroms or less, more preferably about 70 Angstroms or less, and most preferably 50 Angstroms or less. In addition, the particles may have an average particle size which is preferably 40 Angstroms or less and more preferably may have an average particle size which is less than about 30 Angstroms. In addition, the particulates may have a particle size between about 10 to about 70 Angstroms, preferably between about 10 to about 50 Angstroms, more preferably between about 10 to about 40 Angstroms and most preferably between about 10 and about 30 Angstroms.

Experimental observations from high resolution scanning transmission electron microscopy (STEM) of specific embodiments of the instant catalytic material have shown the presence of metallic particles as finely divided metallic particulates dispersed throughout the support like "catalytic clouds". These catalytic regions may comprise nickel and/or nickel alloy regions. The nickel or nickel alloy regions may be regions rich in metallic nickel and/or metallic nickel alloy. These catalytic clouds typically have particulates with an average size of about 10 to about 30 Angstroms in diameter. In some of these regions, the proximity between the particles may be between about 2 to about 50 Angstroms. In other regions, the particles are even more closely packed, having a proximity on the order of about 2 to about 20 Angstroms.

Preferably, the metal particulates of the present invention are "stable" over time. That is, preferably, the size of the particles remains small and does not increase over time. This helps to ensure that the total surface area of the particulate remains stable (i.e., does not decrease) over time.

One aspect of the instant invention is the practical embodiment and method of producing "ultra fine catalysts". Since the catalytic properties of a material are primarily a surface property (rather than a bulk property), large catalytic metal particles essentially waste the interior metallic atoms. For expensive elements, such as platinum, palladium, gold, sliver, etc., the waste of material is unacceptable. Therefore, the smaller the metallic particles, the better, since the surface area for catalysis rises proportionally. However, it is extremely difficult to produce Angstrom size metallic particles. Hence, by providing very small particles, such as 10–50 Angstrom size particles (which themselves may have additional surface area due to surface roughness) in a finely divided distribution, improvements in reaction rate can be produced.

In certain embodiments of the present invention, the catalysts have metal particles that are situated in close proximity to one another so that a high density of individual and discrete particles are obtained. In preferred embodiments, the particulates may have an average proximity that is preferably between about 2 and about 300 Angstroms, and in other embodiments preferably between about 50 to about 100 Angstroms.

In other embodiments of the invention, the percentage weight of the metal may be varied so that the metal particulate is preferably 0.0001% or more, more preferably, 0.001% or more and preferably 0.01% or more. The metal particulate is preferably between about 0.0001% to about 99% by weight of the catalyst, more preferably between about 0.001% to about 99% by weight of the catalyst, most preferably between about 0.01% to about 99% by weight of the catalyst. The metal particulate is preferably 99% or less by weight.

The catalyst of the present invention further comprises a support for the metal particulates. Generally, any support capable of supporting and providing adequate dispersion for the particulate, may be used. Preferably, the support is stable in the local environment where the catalyst is to be used. The support preferably has a surface area and/or porosity sufficient to provide dispersion of the metal particles. However, a support with increased porosity provides more intimate contact between reactants and catalytic material.

In a preferred embodiment of the present invention, the support comprises one or more inorganic oxides. The inorganic oxides preferably include metal oxides. Preferred metal oxides have one or more elements selected from nickel, cobalt, manganese, titanium, zirconium, iron and rare earth elements. Preferably, the inorganic oxide includes two or more of the metals elements, which are preferably selected from the group consisting of nickel, cobalt, manganese, titanium, zirconium, iron and the rare earth elements. In a preferred oxide support, the support is a multi-component, metastable oxide, which may include components of intermediate order, such as microcrystalline or nanocrystalline and/or my include components of polycrystalline materials. It is believed that the addition of modifier elements to the nickel to form a nickel alloy increases the surface roughness of the metal particles. Since surface roughness is the total surface area divided by the geometric surface area, the increased roughness provides for an increase in the total surface area of the metal particulates. The increased surface area provides for an increase in the number of active sites. The addition of modifier elements to metallic nickel may also reduce the effect of poisoning.

Poisoning can affect the metallic particulates. By identifying the poison and the mechanism for poisoning, a suitable modifier may be added to the oxide support to combat the poisoning. For example, poisoning may be due to a build-up of passivating oxides on the surface of the metal particulates, thereby impeding $H_2$ dissociation. In this case, a modifier element such as cobalt, manganese, tin or aluminum could be added at a concentration which is effective to provide an ongoing leaching of the particulate by the electrolyte in order to constantly provide a clean, new metallic surface which is free of the passivating oxide. Also, poisoning may be due to the corrosion of the particulate and/or its support by the electrolyte. In this case a passivating agent, such as Zr or Mn, could be added. Though not wishing to be bound by theory, it is possible that these modified catalysts may be especially resistant to contaminants, such as $H_2S$, $CH_4$, $CO_2$, CO, which may be aggressive poisons to fuel cell anode catalysts. It is also believed that adding certain elements, such as Mn, Al, Sn and Co, to the initial alloy before catalyst formation, can affect how the catalytic metal particulates form. These affects include alloy growth inhibition, which can affect the average size of the particles thereby causing them to remain small.

In a preferred oxide support, the support comprises an oxide of nickel. In another preferred oxide support, the support comprises an oxide of manganese. In another embodiment, the support comprises an oxide of cobalt. In another embodiment, the support comprises an oxide of titanium. In another embodiment, the support comprises an oxide of zirconium. In another preferred embodiment, the support comprises at least one oxide selected from the oxides of La, Y, Ce, Pr, or Nd. In another embodiment the support comprises silica. In another embodiment, the support comprises alumina.

In a preferred oxide support, the support comprises an oxide of nickel and at least one other element. Preferred elements include cobalt, manganese, lanthanum, misc. metal, rare earth and/or aluminum.

The support about the metal particles is preferably porous and may be "sponge-like" in shape. "Sponge-like" and porous supports may be made by including in the initial alloy, an easily corrodible modifier element, such as aluminum, tin or the like, whose sole purpose is to be preferentially corroded so as to leave a plurality of catalyst particles within a high surface area oxide support. A preferred way for providing preferential corrosion is by subjecting a metastable alloy to an aqueous solution of alkali metal hydroxide, such as potassium hydroxide, lithium hydroxide, sodium hydroxide, or mixtures thereof. Preferential corrosion is preferably done in a highly concentrated base solution (such as about 45 wt % to about 60 wt % or more). Preferential corrosion is preferably done at elevated temperature, such as at about 80 C. to about 120 C. Preferential corrosion may also be done over an extended time, such as from about one hour to about twenty hours, depending on the above other conditions and also depending upon the composition of the alloy. Of course, variations in conditions may also be possible, which meet the objects of the above conditions, such as acid etch, preferential corrosion with annealing, etc.

In another preferred embodiment of the instant invention, these ultra-fine catalysts may be combined with zeolite materials. The zeolites may have variable metal to silicon ratios, and the ratio of the catalyst to zeolite may also vary. A combination of catalyst/support oxide/zeolite is a preferred embodiment.

The oxide support may itself be catalytic. By using certain oxides as the support material, regions of exceptionally high catalytic activity may be formed, especially at the double or triple junctions between the metallic particle and the support oxide where designed regions of preferred chemical properties may be formed. The oxide support may comprise fine-grained oxides, coarse-grained oxides, or a mixture of fine-grained oxides and coarse-grained oxides. The oxide support may also be formed from metal oxides, which are predominantly of intermediate order (20–150 angstroms in size), such as "nano crystalline" and/or "microcrystalline" in structure. Because of their small crystallite size, these oxides have an increased number of grain boundaries, which provide "ionic pathways" for both hydrogen and hydroxyl ions. (These ionic pathways may permit the hydrogen and hydroxyl ions to move more freely to the metallic catalytic sites, which may be situated at grain boundaries). Hence, such oxides facilitate ionic transport throughout the catalytic material. Alternately, the oxide support may be formed so that it comprises a "multi-phase" oxide material, such as manganese oxide, MnOx. Because manganese oxide is multivalent, it is believed that it may further promote increased catalytic activity by changing oxidation states. For example, the oxide may be formed so that it includes both fine-grained and coarse-grained regions. The fine-grained region may include oxides, such as manganese oxide MnOx, Ni—Mn—Co oxide or Mn—Co oxide. One advantage of a multiphase oxide may be the suitable structural integrity of the fuel cell anode to withstand the rigors of transportation where vibration can cause premature electrode failure. The coarse-grained regions may include multi-component oxides such as Ti—Zr oxide, Mm oxide, or La oxide.

Analytical studies of alloys prepared by preferential corrosion show that regions rich in such elements such as nickel, cobalt, and manganese along with at least one element typically designated as a hydride former can be produced from a variety of alloys. These regions may be referred to herein as "Ni—Co—Mn" "super catalytic regions". It is believed that these super catalytic regions may consist of nickel-manganese alloy particles embedded in a titanium-zirconium oxide, or embedded in a mish metal oxide. These super catalytic regions show a surprising lack of oxygen (based on the results of Electron Energy Loss Spectroscopy-EELS). It is also believed that the oxide portion of these regions may be partially metallic and/or exist in a low oxidation state.

The catalytic materials of the present invention may be formed so that the metal particles have specific crystal structures (based on Select Area Electron Diffraction-SAED) within the oxide support. For example, catalytic materials comprising nickel or nickel alloy particles embedded within an oxide support may be formed so that the alloy particles have a face-center-cubic (fcc) structure. The formation of an fcc crystal structure may be influenced by the high degree of substitution of the modifier elements (such as Co, Al, Mn, Sn) in the initial alloy. Fcc nickel or nickel alloy particles in conjunction with Ni—Co—Mn super catalytic regions and other oxides (hydride former type oxides) forms a structure which may further promote ionic diffusion and reaction.

In an alternate embodiment of the present invention, the support may be formed of or include a carbon material. Examples of carbon materials include carbon black, graphite, activated carbon, charcoal and carbine. Mixtures of carbon materials and inorganic oxides may also be used. Alternately, the support may comprise carbide. For example, the support may comprise a binary compound of carbon and another element. (Examples of carbides include those of calcium, tungsten, silicon, boron, and iron). Additionally, other mixtures or blends of supports can be used to provide high surface area for the catalytic metal particulate and good electronic conductivity as well as good ionic transport.

Alternately, the support may comprise a halide such as a chloride. Alternately, the support may comprise a phosphide, a silicide, or a nitride. Of course, the support may be a blend or mixture of the materials described above.

Although the stating material for the making catalysts in accordance with the present invention are wide and varied, the starting material preferably include hydrogen storage alloys. These are materials, in certain states and under certain conditions, are capable of the absorption and release of hydrogen. Hydrogen storage alloys include AB, $AB_2$, and $AB_5$ type hydrogen storage alloys as well as others. Preferred $AB_5$ materials have an A to B ratio of 5 to 5.3. The alloys may be stochiometric and/or non-stochiometric. Examples of very simple hydrogen storage alloys include Ti—Ni, Mg—Ni, $LaNi_5$, modified Ti—V—Ni, and modified $LaNi_5$. Examples of hydrogen storage alloys, which may be used in combination with the present invention, include those described in U.S. Pat. No. 4,623,597 (the disclosure of which is incorporated by reference). The materials described in the '597 Patent are atomically engineered materials with a high density of catalytically active sites for enhancing the capabilities of the hydrogen storage alloys. These materials were fabricated by manipulating the local chemical and structural order by incorporating selected modifier elements into a host matrix so as to create the desired disorder. Additional hydrogen storage alloys are disclosed in U.S. Pat. No. 4,551,400 ("the '400 Patent"), the disclosure of which is incorporated herein by reference. These materials utilize a generic Ti—V—Ni composition where at least Ti, V, and Ni are present with at least one or more of Cr, Zr, and Al. Other Ti—Vi—Zr—Ni alloys are described in U.S. Pat. No. 4,728,586 ("the '586 Patent"), the disclosure of which is incorporated by reference. The '586 Patent described a specific sub-class of these Ti—V—Ni—Zr alloys comprising Ti, V, Zr, Ni, and a fifth component Cr. Modified LaNi5 materials are discussed in U.S. Pat. No. 5,096,667, ("the 667 Patent") the contents of which is incorporated by reference herein. Still other examples of hydrogen storage alloys are described in U.S. Pat. Nos. 5,840,440, 5,536,591 ("the '591 Patent") and in commonly assigned U.S. patent application Ser. No. 09/290,633 ("the 633 Application" the disclosures of which are herein incorporated by reference). Examples of alloys described in the '591 Patent are alloys having the composition: (Base Alloy)-Co—Mn—Fe—Sn where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 7 atomic percent; d is 0 to 3.5 atomic percent; e is 0 to 1.5 atomic percent; and a+b+c+d+e=100 atomic percent. Many of the alloys described in the '591 Patent include Mn, the effects of which is discussed in the '667 Patent, the disclosure of which is incorporated herein by reference. The '633 Application describes certain hydrogen absorbing alloys formed by adding one or more modifier elements to certain "base" alloys. The base alloys preferably have a composition consisting essentially of 0.1 to 60% Ti, 0.1 to 40% Zr, 0 to 60% V, 0.1 to 57% Ni, 5 to 22% Mn and 0 to 56% Cr. The modified alloys which are described in the '633 Application are referred to herein as "the '633 alloys". Preferably, the modifying elements are chosen from the group consisting of Al, Co, Sn, and optionally Fe.

Hydrogen storage alloys tend to react with oxygen to form metal oxides by the reaction:

$$M+x/2O^{2-} \leftrightarrows MO. \qquad (2)$$

Hydrogen storage alloys are sensitive to the formation of surface oxides so that most, if not all, of these alloys comprise an initial 'native' surface oxide layer. The composition of this initial surface oxide layer depends, at least in part, on the composition of the initial alloy material (that is, upon the constituent metals which make up the bulk material as well as the atomic percentage of those metals). The native oxide surface layer is typically between about 50 Angstroms to about 1000 Angstroms thick. A preferred oxide thickness formed in accordance with the present invention is greater than 1000 Angstroms thick, and is more preferably 2000 Angstroms or greater and more preferably 5000 Angstroms or greater in thickness.

A modified surface oxide may be provided by an etch process, such as the alkaline etch process described in U.S. Pat. No. 4,716,088 ("the '088 Patent") as well as in commonly assigned U.S. patent application Ser. No. 09/395,391

("the '391 Application"). Both the '088 Patent as well as the '391 Application are incorporated by reference herein. As described in the '088 Patent, the major role of the etch process is that of surface modification. The '088 Patent, '391 Application as well as the '591 Patent and the '633 Application describe effects of an etching on surface oxide modification.

A preferred method for making the catalytic material of the present invention is by subjecting an alloy starting material (which is preferably in the form of a powder) to preferential corrosion. Preferential corrosion of a preferred method includes a deep, penetrating "bulk" leaching process. This means that the leaching agent (the active material that does the leaching) may penetrate well below the 50 to 1000 Angstrom native surface oxide layer of the alloy particle and into the particle bulk. As used herein, "bulk" refers to the interior region of the particle beneath the surface oxide. Preferential corrosion penetrates and treats at least a significant portion of the bulk alloy powder to remove some elements while permitting atomic rearrangement of other elements, e.g. preferential corrosion. Preferably, a significant portion of the initial alloy is preferentially corroded, and more preferably a majority of the initial alloy is preferentially corroded. In a preferred embodiment, the entire initial alloy is preferentially corroded.

In a preferred method for making a catalyst, an initial alloy is preferentially corroded to form an oxide support. The initial alloy is preferably includes regions of amorphous, nanocrystalline, microcrystalline and/or polycrystalline material lacking long range order. The initial alloy is preferably a multi-component, multiphase, metastable, crystalline alloy. Examples of disordered materials are provided in U.S. Pat. No. 4,487,818, the contents of which are incorporated herein by reference.

In a preferred method for making a catalyst, a hydrogen storage alloy starter material is formed into a powder and the powder is preferentially corroded. The hydrogen storage alloy may be made by any suitable method, such as by combining two or more metals using techniques such as melt/cast, rapid quench, etc. The powder may be made by any suitable method, including grinding, hydride/de-hydride reduction, or in the case of rapid quench methods, powder is formed by use of a chill-wheel, etc. The hydrogen storage powder preferably has average particle size of more than about 1 $\mu$m, but preferably less than 100 $\mu$m.

A preferred catalytic material includes finely divided, non-noble metal particulates embedded in an oxide support. In particular, the metal particulates preferably include metallic nickel and/or a nickel alloy and more preferably are predominantly nickel. A catalytic material which includes finely divided, non-noble metal particulates embedded in an oxide support may be made by subjecting the hydrogen storage alloy material to preferential corrosion. The preferential corrosion preferably includes a leaching which penetrates into bulk of the initial alloy and converts oxidizable components to oxides. The hydrogen storage material or powder particles are preferably leached to a depth of at least 10%, more preferably at least 25%, and most preferably at least 50%. In another embodiment of the instant invention, the hydrogen storage powder particles are preferably leached to at least 75% of each hydrogen storage alloy particle, and more preferably, at least 90% of each hydrogen storage alloy particle.

The hydrogen storage leaching may be accomplished by "contacting" an alloy with an appropriate leaching agent for a period of time, temperature and at a specific pH sufficient to convert the alloy material to an oxide form. A preferred leaching agent is an alkaline solution. The hydrogen storage alloy may be "contacted" with the alkaline solution by placing the alloy (which is preferably in powder form) in a container of alkaline solution. The alkaline solution is preferably formed as an aqueous solution of an alkali metal hydroxide. Examples of alkali metal hydroxides, which may be used, include potassium hydroxide, sodium hydroxide, lithium hydroxide, and mixtures thereof. The period of time in which the leaching material is in contact with the hydrogen storage alloy, as well as the temperature and pH of the leaching agent may be varied and will be determined by the desired effects and alloy composition. For example, many metallic components may be readily oxidized by concentrated alkaline solution. However, some metallic elements and/or alloys within the bulk of the alloy are resistant to oxidation by the alkaline solution. By choosing an appropriate starting alloy and then subjecting this starting alloy to the alkaline solution for a certain period of time and at a certain temperature and pH, it is possible to convert certain oxidizable components while forming other metal particles. In addition to converting oxidizable components of the hydrogen storage alloy material to oxides, the leaching treatment may also alter the composition of the oxides. The alkaline solution may do this by dissolving the more soluble oxide components out of the oxide portion. For example, the oxides of manganese, vanadium, aluminum, cobalt, and tin are readily soluble in an alkaline solution while others, such as those of titanium, zirconium, La, Mm and nickel are less soluble. Those oxides, which are more soluble, will be removed from the oxide layer. The less soluble oxides will either remain as part of the oxide or enter the alkaline solution as colloidal particles. Hence, the composition of the oxide portion can be selectively altered. Hence, in a preferred embodiment, the catalytic material of the present invention may be formed by selecting an appropriate alloy starting material and then preferentially corroding the starting alloy with a suitable leaching agent under suitable conditions (i.e., time, temperature and pH) to generate an oxide support having metallic particles distributed throughout the oxide support. The metallic particles in this embodiment may be solely provided by elements native to the starting alloy. Confirmation of the appropriate conditions for the alloy type may be verified by TEM analysis. Hence, preferential corrosion provides a cost effective way to make a catalytic material comprising discrete metallic and/or alloy particles integrally fixed with a support oxide having extremely small particle size and high density (i.e., ultra-fine metallic catalysts).

By providing metal particulates which have been derived from native atoms, extremely small catalytic particles can be produced. As discussed above, the particles may be made with have an average particle size which is preferably 150 Angstroms or less, 100 Angstroms or less, more preferably 70 Angstroms or less, and most preferably 50 Angstroms or less. In addition, in certain embodiments of the present invention the particulate may have a particle size between about 10 to about 70 Angstroms, preferably between about 10 to about 50 Angstroms, more preferably between about 10 to about 40 Angstroms, and most preferably between about 10 to about 30 Angstroms.

Further, when nickel or other insoluble metals are provided in the support oxide starting material, by selectively removing the more soluble components of the oxide portion, catalytic material with a high concentration of catalytic metal and/or alloy sites may be produced. For example, nickel and nickel alloys, in their metallic state, are catalytic and electrically conductive, and these catalytic properties are imparted to the oxide region. The oxide region is thus more catalytic and conductive than if it contained a higher concentration of insulating oxides. Removing the more soluble oxide components also makes the oxide region more porous. An increase in porosity increases the permeability of the oxide region to diffusion and transport of molecular hydrogen as well as to diffusion and transport of certain ions, such as hydrogen and hydroxyl ions. An increase in porosity also increases the surface area of the oxide region.

Figure 3:
FIG. 3 is an SEM micrograph of hydrogen storage material after etching for 2 hours and after etching 10 hours.
Figure 3:
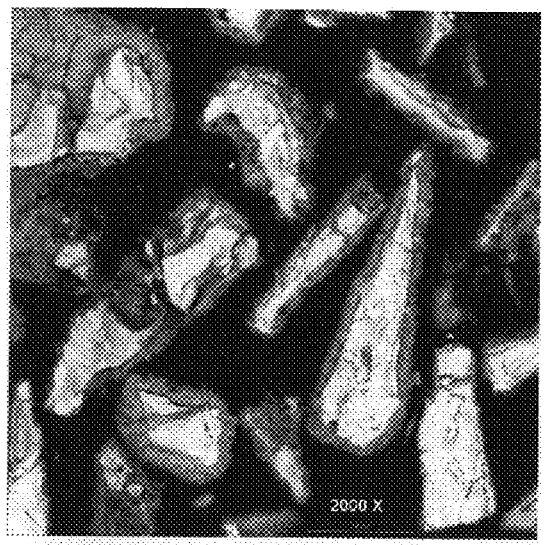

The leaching process in accordance with a preferred aspect of the present invention may be used to oxidize substantially the entire starting alloy. Preferential corrosion and/or leaching conditions (i.e., leaching time as well as temperature and pH of the leaching material) may be selected which aggressively etch the starting alloy particles so that only oxides with suspended catalytic particles remain. Although not desiring to be bound by theory, it is believed that by preferentially corroding the initial alloy, forces permit metallic attraction of certain atoms to rearrange themselves in a finely divided state, such as between 10 and 150 angstroms in diameter. As such, the metals atoms essentially coalesce into small regions, which have a greater density of metal atoms than in the initial alloy. The support oxide is preferably made porous by a deep leach, which alters the original surface oxide For example, to form catalytic materials of the present invention, material may be preferentially corroded under conditions selected based on the starting material chosen, such as leaching agent, temperature, time and concentration. Preferred temperatures includes those of 60° C. or above, and more preferably 100° C. or above. The leaching agent is preferably an alkali metal hydroxide with a preferred concentration of at least about 30 weight % or more, more preferably at least about 40 weight %, and most preferably at least about 60 weight %. Of course, the leaching conditions are not limited to the above ranges and may be varied to achieve the desired results. Preferred times include 1 hour or more, 2 hours or more, and 10 hours and more. As shown in FIG. 3, etching or leaching of a modified Ti—Ni alloy for 2 hours produces a thick oxide surface layer, while etching for 10 hours produces an even thicker oxide layer.

In another embodiment of the method of making the catalytic materials of the present invention, the leaching material used may be an acidic. The acidic solution may be an aqueous solution of one or more acids. Examples of acids, which may be used, include HF, HCl, $H_2SO_4$, and $HNO_3$. Blends of two or more acids may also be used. An example of a blend, which may be used, is an aqua regia. An example of an aqua regia is a mixture of nitric acid and hydrochloric acid. The leaching process may be implemented by "contacting" an alloy with an acid (such as HF) for a predetermined period of time, at a specific temperature and at a specific pH.

It is also possible that the desired catalytic materials be made by using two or more leaching conditions. For example, a first alkaline leaching treatment may be performed under a first set of etch conditions (i.e., a first alkaline material as well as a first time, temperature and alkaline concentration), and then a second alkaline leaching treatment may be performed under a second set of etch conditions (i.e., a second alkaline material as well as a second time, temperature and alkaline concentration). This process may be repeated with further, subsequently applied, alkaline leaching treatment(s). Alternately, one or more of the alkaline leaching treatments may be replaced with one or more acidic leaching processes (wherein the leaching material is an acidic solution). Hence, the leaching process may comprise two or more acidic etch treatments. Alternately, the leaching process may comprise one or more alkaline leaching treatment and one or more acidic leaching treatments. In a particular embodiment, the leaching process may comprise alternating alkaline leaching treatments and acidic leaching treatments. This multiple leaching treatment is an especially aggressive method to more fully alter the starting alloy and the native surface oxide.

It is also possible that the instant invention may be promoted by forming a catalyst, which is "compositionally graded". As used herein, compositional grading refers to forming the catalyst so that there is a continuous change (linear or non-linear) in some aspect of the composition in a chosen direction. (Preferably, there is a continuous increase or decrease in some aspect of the composition). For example, a compositionally graded catalyst may be formed into an anode so that there is an increase in the density of the catalytic sites from the hydrogen input side (i.e., the side adjacent the hydrogen input) to the electrolyte side. In one embodiment, the catalyst is compositionally graded so that there is a continuous decrease in the density of the catalytic sites from the hydrogen input side to the electrolyte side of the anode.

As discussed above, it is also possible to form a support, which comprises materials other than oxides. For example, the support may include chlorides, phosphides, silicides, and carbides. These materials may also be made using a deep, penetrating leaching process. The leaching material is appropriately chosen to convert the starting hydrogen storage alloy material to the desired support material. (Of course mixtures of materials may also be formed-with or without oxides). For example, a catalytic phosphide may be formed comprising a finely divided metal particulate embedded in a phosphide.

In an alternate embodiment of the invention, by selecting the appropriate starting material as well as an appropriate leaching process it is also possible to extract substantially all of the soluble oxide components of the starting material, leaving behind small, catalytically active particles. These catalytically active particles may be affixed to a support material or a support structure. For example, they may be mixed with a carbon support material. Alternately, they may be affixed to a support structure such as a conductive grid. In addition, they may even be mixed together with a binder, such as PTFE, for mechanical stability.

In an alternate embodiment of preferential corrosion, the preferential corrosion may be electrochemically assisted. That is, a potential may be applied to the alloy powder so as to make it easier to convert the oxidizable components of the alloy to their respective oxides or to remove the more soluble oxides from the material after the oxides are formed. This type of electrochemically-assisted treatment is referred to herein as "electrochemical leaching". The electrochemical leaching is similar in concept to electrochemically assisted etching (applying potential to assist the etching process) which is described in detail in the '088 Patent, however by applying different conditions to different alloy compositions, different results may be obtained.

From the discussion above, by first formulating a hydrogen absorbing alloy material with an appropriate composition and then subjecting this alloy to a leaching process having the appropriate leaching conditions (i.e., time of leaching as well as temperature and pH of the leaching material), substantially the entire starting alloy may be oxidized to form a highly catalytic material comprising nickel and/or nickel alloy particulates embedded in an oxide support. Generally, by carefully choosing the starting alloy as well as the leaching conditions, this catalytic material may be designed to have the desired catalytic, electrochemical, and physical properties. As seen from the above discussion many different properties may be modified. These properties include, but are not limited to 1) the size, density, roughness and composition of the catalytically active sites, 2) the composition of the oxide support material, 3) crystal structure of the catalytic sites, 4) composition of the oxide support, 5) the grain size of the oxide support, 6) the surface area and porosity of the oxide, 7) the permeability of the oxide to hydrogen gas and to ionic transport (including, but not limited to, hydrogen and hydroxyl ion transport), and 8) the percentage of the hydrogen storage alloy particle converted to oxides.

In a most preferred embodiment of the instant invention, the catalytic material is preferably subjected to surface enrichment with metal. Surface enrichment may be provided by any suitable method, but is preferably provided by precipitating fine metal onto the catalytic material. Precipitating metal onto catalytic material may be provided by any suitable method, such as electroless or electrolytic deposition. Preferably, the metal is deposited on the surface of the catalytic material by electroless deposition. If the metal is deposited as an oxide, the oxide is preferably reduced to a low oxidation state, such as 0, have an average oxidation state of less than 1. The coating may be multivalent, but preferably has a oxidation state indicative of metallic behavior, and may be predominately 0. In a most preferred embodiment of the present invention, a catalyst is at least partially covered with a metal. As defined herein, the term metal should be given its broadest interpretation and includes pure metals, metal alloys, metal composites, solid solution metals, etc. The metal at least partially covering the catalyst is preferably a high surface area metal. A high surface area metal preferably has a surface area greater than 0.5 m2, more preferably greater than 1 $m^2$, and more preferably 5 $m^2$ or more and most preferably 10 $m^2$ or more. In some cases, high surface area metal may be applied to the catalyst with a surface area as high as 100 $m^2$ or more. The metal is preferably porous. A porous metal increase surface area and may also allow hydrogen to penetrate the surface, which in turn can have an affect on reactivity rates.

The metal at least partially covering the catalyst is preferably selected based on the application in which the catalyst is to be used. For example, for hydrogen oxidation reactions, the metal preferably includes nickel, cobalt, and/or copper. However, other metals may be chosen. Further, the metal may be provided as an alloy. Providing the metal as an alloy provides a metal having properties that differ from pure metal alone. For example, nickel may be alloyed with cobalt to provide an enhanced catalytic layer that is made from non-noble metals. Alternatively, the metal may be alloyed with a noble metal, such as platinum, palladium, gold, silver, etc, which provides a balance between performance and cost.

The metal at least partially covering the catalyst preferable penetrates the outer surface boundary of the support. By penetrating the outer surface boundary of the support, the metal can form tentacles, and/or dendrites that branch from the outer boundary of the support into the material. This penetration of metal can provide close proximity of a new phase to the catalytic particles as described above. As such, the metal at least partially covering the catalyst is preferably within 2 to 1000 Angstroms of at least some catalytic metal particles as described above. The metal at least partially covering the surface may then provide a catalyst having three or more phases, which may include amorphous, nanocrystalline and/or microcrystalline regions and may alternatively include polycrystalline regions.

Although not wishing to be bound by theory, the instant inventors believe that wavefunction overlap may be a contributing factor in the properties of various embodiments of the catalyst, especially when there is a high density of grain boundaries. For example, the catalyst may have a metal particulate phase, a grain boundary oxide and a high surface area metal phase in contact with the grain boundary oxide. Each of these phases contains the atoms and electrons of their respective chemical composition which normally combine to impart physical and chemical properties characteristic of each phase. In a classical mechanical context, each of the three phases would be independent of the other two phases, and the properties of the three-phase combination would only be an average of the properties of the combined individual phases. The classical model, however, is only valid in the limit of thick phases and becomes increasingly inadequate as the interactions between two, three or more of the phases at the atomic level or local order begin to dominate the material.

As interactions at the local order begin to dominate, the quantum mechanical properties of electrons present in a phase becomes increasingly important and determinative of the chemical and physical properties of not only the individual phases but the overall material itself. In a quantum mechanical context, each of the electrons present in a phase may be described by a wavefunction. The wavefunction captures the wave-particle duality inherent to electrons and dispenses with the purely classical notion that electrons are localized particles with distinct boundaries. According to quantum mechanics, electrons possess both wave and particle properties with the wavelike properties becoming increasingly important as the physical dimensions of phases become smaller and smaller. One consequence of the wavelike properties of an electron is the ability for the electron to extend beyond the physical boundaries of a phase. This effect may provide an opportunity for an electron present in one phase to interact with electrons in other phases. An electron in a phase in the quantum regime (that is, an electron in a phase having dimensions sufficiently small to permit manifestation of appreciable wavelike phenomena of electrons) is able to at least partially delocalize into an adjoining phase and thereby interact with the electrons and atoms of that phase. The delocalization is tantamount to a penetration or overlap of adjoining phases by the electron and corresponds to a physical presence of the electron outside of the boundaries of the phase in which it originated. If each of two phases in physical contact has physical dimensions in the quantum regime, the penetration or overlap occurs mutually as electrons from each phase delocalize into the other phase. Quantum mechanical overlap of electron density across one or more phases renders invalid the classical notion that combinations of phases have properties that are simple superpositions of the properties of the contributing phases. Instead, overlap may lead to synergistic effects that lead to unexpected chemical and physical properties. As such, in a preferred embodiment of the instant catalyst, especially where grain boundary interactions are numerous, it is believed that one or more of the metal particulate, oxide and high surface area metal phases is in the quantum regime over at least a portion of the volume of the catalyst and that wavefunction overlap as described hereinabove to provide a contributing factor to the superior catalytic properties of the instant catalyst.

The catalyst with a metal at least partially covering the surface thereof may be made by any suitable method.

Preferably, the method includes depositing a high surface area metal on the support and/or catalyst. Preferably, the metal is applied to the support by an electroless deposition process. An electroless deposition allows high surface area metal to be formed.

The electroless process may be electroless plating or impregnation. The electroless deposition process is preferably provided by precipitating metal from a metal salt solution onto the catalyst. Precipitating metal onto the catalyst may be accomplished by any suitable means, such as mixing a powder with a metal salt solution at a suitable pH and temperature. Preferred metal salt solutions include chlorides, nitrates, sulfates, carbonates, etc. A preferred metal salt solution contains non-noble metal, and/or nickel, and/or cobalt, and/or copper, and/or at least one noble metal.

Preferably, electroless deposition is preformed in a reducing environment. The reducing environment may be provided by any suitable reducing agent. An electroless deposition that is preformed in a reducing environment permits a metal element to be applied to the catalyst in a metallic state, e.g. 0 oxidation state. Alternatively or additionally, the catalyst may be exposed to a reducing agent after the metal atoms are supplied to the catalyst to provide reduction of said surface atoms, such as by exposing the surface to hydrogen gas. The reducing environment is preferably provided by any solution capable of providing ions for reduction of oxides. Preferably, the reducing environment is provided by an alkaline metal hydroxide, such as potassium hydroxide, lithium hydroxide, sodium hydroxide and combinations of the above. An alkaline metal hydroxide provides free hydrogen, which acts as a suitable reducing agent. The alkaline metal hydroxide is preferably a 10 to 60 wt % solution. Other conditions such as time and temperature may be adjusted to control the way and the amount of metal deposited in the catalyst.

Preferably, the method for making a catalyst with a metal that at least partially covers the catalyst allows metal to penetrate the surface boundary of the catalyst. Metal atoms can be provided below the surface boundary by any suitable means. Preferred means for providing metal atoms below the surface boundary of the catalyst include impregnation, impregnation of a porous surface and/or coating pores. When a porous support is exposed to a metal salt solution, the solution can penetrate the porous regions leaving metal deposits far below the surface (at least 20 Angstroms). The deposits may be formed as a continuous layer, or may be formed as discrete regions. The deposits may reside within the pores, thereby reaching into the catalyst support like tentacles or along the grain boundary as rivulets.

As discussed above, the catalyst of the present invention may be particularly useful in dehydrogenation and/or dehydrogenation reactions. In particular, the dissociation of the $H_2$ gas reactant and subsequent reaction with hydroxyl ions from the electrolyte to form water with the release of an electron according to the reaction equation:

$$H_2(g) + 2OH^- \leftrightarrows H_2O + 2e^-. \quad (3)$$

may be assisted by the following sub-mechanism:

$$H_2(g) + 2M \leftrightarrows 2MH. \quad (3a)$$

$$2MH + 2OH^- \leftrightarrows 2M + 2H_2O + 2e^-. \quad (3b)$$

where the molecular hydrogen is first absorbed by the hydrogen storage alloy (step 3a) and then reacted with the hydroxyl ions from the electrolyte (step 3b). Optimized ratios of unoxidized metal alloy material to catalytic oxide can be determined by optimization experiments. It is possible to produce a catalytic material having such optimized ratios by the appropriate choice of the starting hydrogen storage alloy as well as the appropriate choice of conditions in the bulk leaching process used to treat the alloy.

Furthermore, as can be seen from the above discussion, a catalytic material may be formed to make it particularly well suited for use as a hydrogen oxidation catalyst in fuel cells. Specifically, the catalytic material may be formed so that it is 1) highly catalytic for the consumption of molecular hydrogen, 2) electrically conductive for the transport of electrons, 3) permeable to the diffusion and transport of hydrogen gas, 4) permeable to the diffusion and transport of ions such as hydrogen ions and hydroxyl ions, 5) permeable to the diffusion of a liquid electrolyte, and 6) a barrier to the gas phase H2 on one side of the anode and the electrolyte on the other side. All of the aforementioned properties are desirable properties for using the catalytic material of the present invention as the active material for a fuel cell anode.

Generally, the catalytic material of the present invention may be used as the active material for the anode of any fuel cell. Examples of fuel cells include proton exchange membrane fuel cells (PEM), alkaline fuel cells (AFC), phosphoric acid fuel cells (PAFC), molten carbonate fuel cells (MCFC), and solid oxide fuel cells (SOFC). In all cases, while the electrolyte and sub-reactions can be different, the basic point of $H_2$ gas dissociation to form water with release of current, in a hostile environment is common.

In one embodiment, the catalytic material may be used as the active material for the anode of an alkaline fuel cell. An alkaline fuel cell typically comprises an anode, a cathode and an alkaline electrolyte held within a porous non-conducting matrix between the anode and the cathode. Potassium hydroxide is typically used as the alkaline electrolyte in an alkaline fuel cell. The anode comprises a conductive substrate and an anode layer supported on the substrate. The cathode comprises a conductive substrate and a cathode layer support on the substrate. Hydrogen gas is fed to the anode and oxygen gas is fed to the cathode. In the embodiment shown, the hydrogen gas is fed to the anode via the hydrogen compartment, and the oxygen gas is fed to the cathode via the oxygen/air compartment. The reactant gases diffuse through the electrodes to react with the electrolyte in the presence of the catalyst to produce water, heat and electricity. At the anode the hydrogen is electrochemically oxidized and give up electrons according to the reaction:

$$H_2(g) + 2OH^- \leftrightarrows 2H_2O + 2e^-. \quad (4)$$

The electrons so generated are conducted from the anode through an external circuit to the cathode. At the cathode electrons are electrochemically combined with the oxidant according to the reaction:

$$\tfrac{1}{2}O_2(g) + H_2O + 2e^- \rightarrow 2OH^-. \quad (5)$$

A flow of hydroxyl (OH⁻) ions through the electrolyte completes the electrical circuit. As discussed, the anode comprises an anode layer affixed to a conductive substrate.

The anode layer may include catalytically active material as in the above describe embodiments and a polymeric hydrophobic material. An example of a polymeric hydrophobic material is PTFE. The active material may be intermixed with the hydrophobic material. The catalytically active material forms a network of electrolyte-filled channels through the anode layer. The above described electrochemical reactions occur at the surface of the catalytically active particles. The porous hydrophobic material binds the anode layer together and provides a network of channels through which reactant gases gain access to the catalytic surface of the active material. In an alternate embodiment, the hydrophobic material may be in the form of a hydrophobic layer (rather than being intermixed with the catalytic material). The hydrophobic layer may be placed adjacent to a catalyst layer. The catalyst layer may be in the form of catalytic material, which is affixed to a conductive substrate.

In another embodiment, the catalytically active material of the present invention may be used as the active material for the anode of a proton exchange member (PEM) fuel cell. A PEM fuel cell is described in detail in U.S. Pat. No. 5,234,777, the disclosure of which is incorporated herein by reference. A PEM fuel cell uses a proton exchange membrane (also known as a solid polymer electrolyte) to provide ion exchange between the cathode and anode electrodes. The electrochemical reactions at the anode and cathode for a proton exchange membrane (PEM) fuel cell are as follows:

$$H_2(g) \leftrightarrows 2H^+ + 2e^-. \quad (6)$$

$$\tfrac{1}{2}O_2(g) + 2H^+ \leftrightarrows 2e^- + H_2O. \quad (7)$$

Like the reactions of an alkaline fuel, the reactions of a PEM fuel cell also involve the oxidation of hydrogen gas. For a PEM fuel cell, the electrical circuit of the fuel cell is completed by positive ion movement in the form of a hydrogen atom from the anode to the cathode (in contrast to the alkaline fuel cell where there is negative ion movement in the form of a hydroxyl ion from cathode to anode). Like the anode of the alkaline fuel cell, the anode of the PEM fuel cell also comprises a layer affixed to a conductive substrate or a current collector. However, in the case of the PEM fuel cell, hydrophobic material is not needed; hence, the anode may have catalytically active material in accordance with the above embodiments without such material.

In a preferred embodiment, the catalytic material of the present invention may be used in processes that involve hydrogen, such as a fuel cell, where it may be desirable to deliberately leave a portion of the starting hydrogen storage alloy with a small percent of hydrogen storage capacity. Preferably, the catalyst, but more preferably the oxide support is left with a hydrogen storage capacity of less than 10%, 5% or less and more preferably 1% or less of reported theoretical hydrogen storage capacity. By leaving the oxide support or catalyst with only a small amount of hydrogen storage capacity, the embedded catalyst can be maximized, while leaving only the minimal amount of hydrogen storage capacity necessary for fuel cell start-up.

EXAMPLE 1

1. A starting alloy was prepared by melt/casting an alloy having a composition La—Ce—Pr—Nd—Ni—Co—Mn—Al having an A to B ratio of about 5.15 and forming a powder therefrom. 500 g powder was etched in 60 wt % KOH for 1 hour at 110° C., filtered and rinsed with water. The powder was combined with 8wt % nickel provided from nickel chloride in 30% KOH at 110° C. for 2 hours with constant stirring, filtered, rinsed with water. The prepared material was then formed into an anode.

2. For comparison purposes, the starting alloy from 1. above was etched in 60 wt % KOH for 10 hours at 110° C., filtered and rinsed with water. The material was formed into an anode.

3. For comparison purposes, starting alloy from 1. above was etched in 60 wt % KOH for 2 hours at 110° C., filtered and rinsed with water. The material was formed into an anode.

4. For comparison purposed, an anode was prepared from commercial catalyst material.

Figure 2:
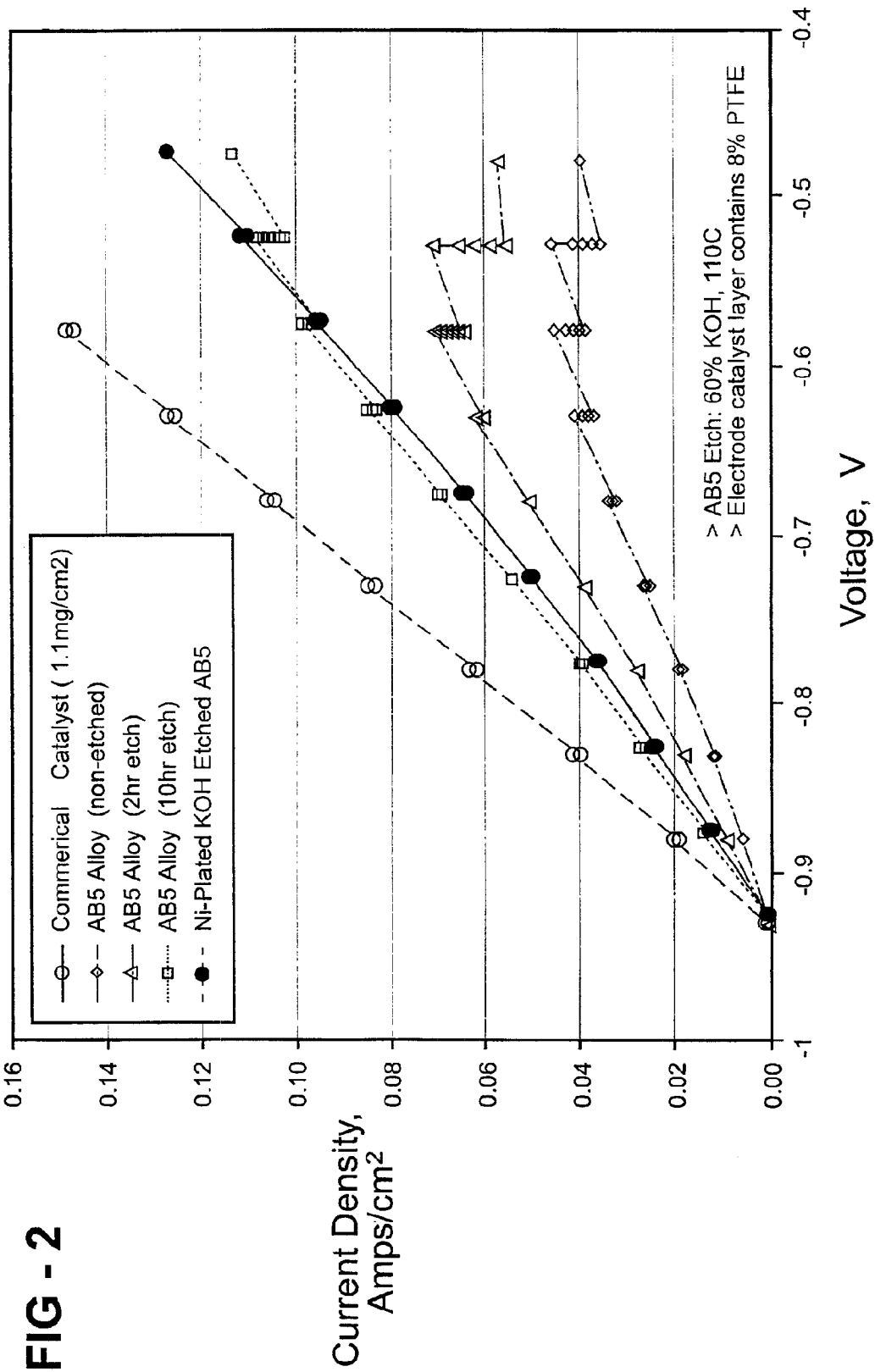
FIG. 2 is a graphical comparison of catalyst in accordance the present invention and other(s).

The electrodes were tested in side-by-side comparisons in half-cell test with a mercury/mercurcy oxide reference electrode and an oxygen reduction counter electrode, the results of the tests are graphically illustrated FIG. 2. As shown in FIG. 2, an electrode made with a catalyst in accordance with the present invention provides substantial improvement over other electrodes and over that of the commercial, control electrode. As can be seen by the comparison, catalyst in accordance with a preferred embodiment of the present invention can be made with higher current density. However, it is still within the spirit and scope of the invention that even if the catalysts as described above were worse than platinum and/or palladium catalysts, they may still have commercial applicability under a cost benefit analysis. This is not only because these non-noble catalysts are so much less expensive on a relative basis than either platinum or palladium, but also because the size and the surface area can be formed much smaller and higher respectively. The overall consequence is that the catalyst user has a higher available concentration of catalyst per unit area compared to conventional platinum or palladium. Further, long-term benefits, other than cost, may include the ability of these "ultra fine catalysts" to operate with relatively long lives in unusually hostile environments without degradation. There is also the advantage the these catalyst can be made very conductive with certain base alloys. As such, a catalyst of a preferred embodiment preferably has a current density of greater than 0.08 a,ps/cm2 at a voltage of −0.75 V or less at room temperature.

EXAMPLE 2

Materials were prepared for magnetic susceptibility testing. Five samples were prepared using powder prepared from the initial alloy of Example 1. The first sample was virgin, unetched material. The second material was combined with 60% KOH for 1 hour at 110° C. The third material was combined for with 60% KOH for 2 hours at 110° C. The fourth material was combined with 60 wt % KOH for 1 hour at 110° C., filtered and rinsed with water and then further treated for 1 hour with 30 wt % KOH at 110° C. The fifth material having a metal at least partially covering the catalyst was prepared as described in 1. above. The results are listed in Table 1 below.

TABLE 1

Magnetic Susceptibility

| Treatment | Ms 1/memu/g |
| --- | --- |
| 1. Virgin, unetched material | 84.3 |
| 2. 1 hr 60% KOH | 897 |
| 3. 2 hr 60% KOH | 1090 |
| 4. 1 hr 60% KOH, 2 hrs 30% KOH | 1189 |
| 5. 1 hr 60% KOH, 2 hrs 30% KOH w/high surface area nickel | 1216 |

Magnetic susceptibility is a surface measurement that is used to indicate the presence of metal. As shown in Table 1, a high degree of metal in the surface can be produced depending on the treatment of the catalyst. As shown preferred materials have a magnetic susceptibility of 1000 memu/g or greater and more preferably have a magnetic susceptibility of 1100 memu/g or greater.

Figure 1B:
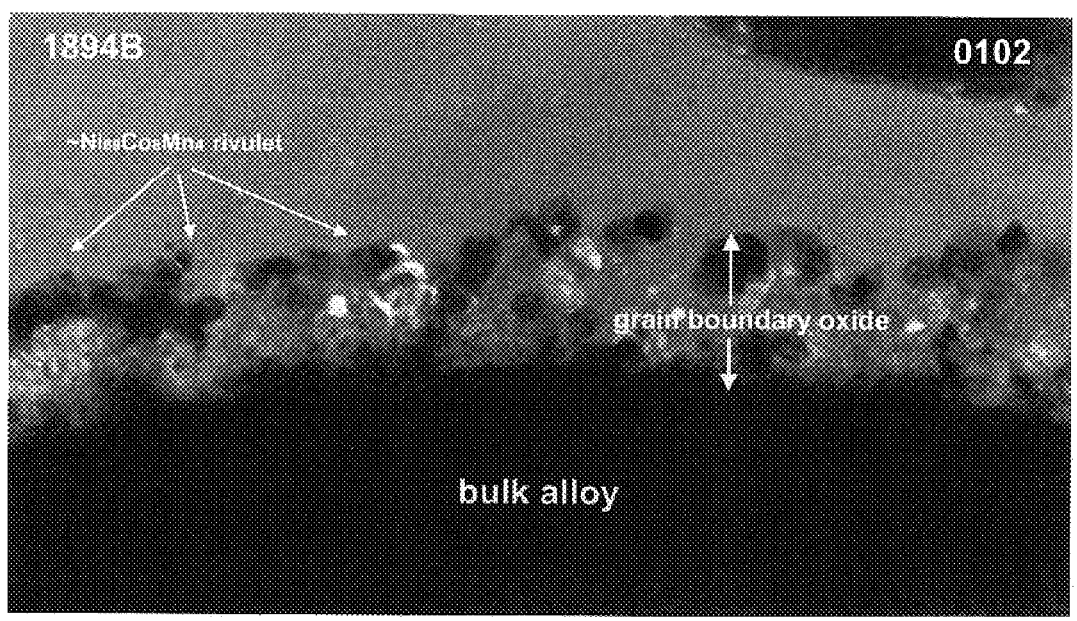
FIG. 1b is bright-field view of a catalyst in accordance with the present invention.

Shown in FIGS. 1a and 1b, is an exemplary catalyst material produced by preferential corrosion and surface enrichment with high surface area nickel. The grain boundary oxide has enriched metallic regions and nickel alloy rivulets.

While the invention has been illustrated in detail in the drawings and the foregoing description, the same is to be considered as illustrative and not restrictive in character, it is understood that only preferred embodiments have been shown and described fully and that all changes and modifications that come within the spirit of the invention are desired to be protected.

What is claimed is:

1. A catalyst comprising:
    a support having internal pores, said support including a bulk alloy and a grain boundary oxide adjacent to the bulk alloy;
    a plurality of finely divided metallic particulates distributed in said support; and
    a metal at least partially covering the surface of said support that penetrates and branches into said support and resides within the internal pores, said metal including a metal chase in contact with said grain boundary oxide.

2. The catalyst of claim 1, wherein the support includes a multicomponent, metastable oxide.

3. The catalyst of claim 1, wherein said finely divided metal particles distributed in the support are 150 angstroms or less in size.

4. The catalyst of claim 1, wherein said finely divided metal particles distributed in said support include non-noble metal particulates that are 150 angstroms or less in diameter.

5. The catalyst of claim 1, wherein said finely divided metallic particulates in said support include non-noble metal particulates that are 100 angstroms or less in diameter.

6. The catalyst of claim 1, wherein said finely divided metallic particulates at least partially cover the surface of said support.

7. The catalyst of claim 1, wherein said metal at least partially covering the surface of the support that penetrates and branches into the support and resides within the internal pores includes nickel, cobalt, or copper.

8. The catalyst of claim 6, wherein said metal at least partially covering the surface of the support that penetrates and branches into said support and resides within the internal pores said support is between 0 and 20 wt % of the catalyst.

9. The catalyst of claim 1, wherein said support includes a preferentially corroded surface.

10. The catalyst of claim 1, wherein said plurality of finely divided metallic particulates are distributed in said support as catalytic clouds.

11. The catalyst of claim 1, wherein said catalyst is permeable to the diffusion and transport of hydrogen.

12. The catalyst of claim 1, wherein said plurality of finely divided metallic particulates distributed in said support are native to said support.

13. The catalyst of claim 1, wherein said plurality of finely divided metallic particulates distributed in said support include particulates that are embedded within said support and below the surface of said support.

14. The catalyst of claim 1, wherein said finely divided metallic particulates are a mixture of particles with different compositions, the particles being an alloy of two or more metals.

* * * * *

UNITED STATES PATENT AND TRADEMARK OFFICE
CERTIFICATE OF CORRECTION

PATENT NO. : 6,964,826 B2
DATED : November 15, 2005
INVENTOR(S) : Stanford R. Ovshinsky et al.

It is certified that error appears in the above-identified patent and that said Letters Patent is hereby corrected as shown below:

Title page,
Item [74], *Attorney, Agent, or Firm*, delete "Frederick W. Man, II" and replace with -- Frederick W Mau, II --.

Column 19,
Line 19, delete "metal chase" and replace with -- metal phase --.

Signed and Sealed this

Seventeenth Day of January, 2006

JON W. DUDAS
*Director of the United States Patent and Trademark Office*